Patented Aug. 27, 1940

2,212,821

UNITED STATES PATENT OFFICE 2,212,821

BLUE SULPHUR DYES AND METHODS OF MANUFACTURING THE SAME

Newell M. Bigelow and John Elton Cole, Wilmington, Del., assignors to E. I. du Pont de Nemours & Company, Wilmington, Del., a corporation of Delaware No Drawing. Application June 29, 1938,
Serial No. 216,476

10 Claims. (Cl. 260—130)

This invention relates to improved sulphur colors and to processes of manufacturing the same, and especially to new blue colors from thionated 3(4'-hydroxy-phenol-amino)-carbazoles.

Blue colors have heretofore been made from certain of the thionated 3(4'-hydroxy-phenyl-amino)-carbazoles by thionating in a medium of alcohol or in a medium of a mono-alkyl-ether of ethylene glycol, the latter being the preferred thionation medium from considerations of economy in time and brightness of shade of the product. In the medium of a mono-alkyl-ether of ethylene glycol, sodium polysulphide represented by the formulae $Na_2S_3$ to about $Na_2S_7$ was used as the thionating agent. Anhydrous thionation media or media containing up to about 10% water were used. Thionation of 3(4'-hydroxy-phenyl-amino)-carbazoles in such media of the mono-alkyl-ethers of ethylene glycol presented various difficulties among which was an extremely fine texture of the thionated color which made it difficult to filter. Upon washing even with salt water the color ran through the filters and there was considerable loss of product in the filtrate. With thionations in alcoholic media, by reason of the nature of the solids, the filter cakes also retained a relatively large amount of moisture, 20% solids in the cakes being a fair average.

A uniform shade of thionated color can rarely be obtained merely by the thionation of indophenols. A controlled oxidation is commonly necessary to attain a standard shade of color. In standardizing the shade of the colors which are thionated in alcohol or in the mono-alkyl-ethers of ethylene glycol as practiced heretofore, the use of strong oxidizing agents such as sodium perborate and hydrogen peroxide were necessary and the operation required a long period of milling, say about 200 hours. In this operation there was a considerable loss of color value. At best, the colors thionated in alcohol were only susceptible to a narrow range of shade modification. It was therefore desirable to provide new thionation products having the desired colors which could be filtered more easily, which would retain less moisture in the filter cakes and which could be standardized at lower cost and without material loss of color value.

New thionated colors have now been discovered which have the suggested improvements, a wide range of shade variation and equal brightness of shade with greater fastness than the thionated colors heretofore produced. The processes of producing the new colors have the advantage of requiring only a short thionation period used in thionating with the mono-alkyl-ethers of ethylene glycol as practiced heretofore and the added advantage that standardization can be accomplished in a relatively short time without excessive grinding and without the use of strong oxidizing agents.

It is among the objects of this invention to provide new thionated colors from 3(4'-hydroxy-phenyl-amino)-carbazoles which have improved physical properties, improved light fastness and improved susceptibility to shade variation by controlled oxidation. Another object of the invention is to provide new and improved processes for producing the new colors. Other objects of the invention will be apparent from the following description.

The objects of the invention are attained in general by thionating a 3(4'-hydroxy-phenyl-amino)-carbazole in a medium containing a mono-alkyl-ether of ethylene glycol a relatively high water content and a relatively high alkali metal polysulphide content as compared to prior art methods. The thionated products are then separated from the reaction media, standardized, if necessary, as by simple aeration, and the color pastes are then made up to the desired consistency by wet milling methods, or converted to powders by methods known to the art.

The invention will be more fully set forth in the following more detailed description which includes examples that are given as illustrative embodiments of the invention and not as limitations thereof.

Example I

A stainless steel thionating kettle provided with a cover, agitator, thermometer, a suitable reflux condenser and means to heat the kettle by steam, oil or electricity was provided.

The thionating kettle was charged with 3.5 parts by weight of mono-methyl-ether of ethylene glycol, 1.5 parts by weight of water, 1.8 parts by weight of sodium hydroxide and 4.0 parts by weight of sulphur, in the order named. The reaction mixture was refluxed for a half hour and then cooled somewhat. 1.0 part by weight of 3-(4'-hydroxy-phenyl-amino)-carbazole was then added and the mixture was heated to boiling and refluxed for about 15 hours.

When the thionation was complete, 2.0 parts of a 30% solution of sodium hydroxide was added to the refluxing mixture over the course of a half hour to prevent precipitation of sulphur. The mixture was allowed to reflux for a half hour longer. Then, while boiling was continued, the distillate was drawn off to a storage tank and water was added to the reaction mixture to replace the distillate. The distillation was continued until approximately 8.0 parts of distillate had been collected.

At this point the distillation was stopped and the reaction mixture was filtered while still hot. The filter cake was washed, first with brine and then with water, until the cake was essentially free of alkali.

The crude product thus obtained was a granular, crumbly cake, which contained about 50% of color. The material filtered readily without running through the filter. About 1.7 parts of product computed as dry product was obtained. Usually the filter cake was a dark blue granular cake which contained over 50% of pure color, variations from 35% to 55% being the usual extreme variations.

The shade of the standard for the product was found to be redder than that of the crude product. The shade of the crude product was then reddened by controlled oxidation as follows:

A slurry of the crude product containing about 15% of pure color was heated to 75° C. and made alkaline to Clayton Yellow paper by adding sodium hydroxide. This mixture was then aerated until the desired shade of the standard product was attained. During aeration further additions of caustic were made if necessary in order to keep the suspension weakly alkaline to Clayton Yellow paper. When the aeration was completed, the slurry was filtered and the product was washed. This redder product of standard shade was then made into a paste by a short milling operation and finally diluted with varying amounts of water to produce various desired more dilute suspensions, or dried and ground to a powder.

Both the redder and the greener shades of the new dye gave stronger dyeings than the thionated dyes on an equal solids basis, which were made by prior art thionation processes in which the thionation medium was alcohol or a mono-alkyl-ether of ethylene glycol. This effect was especially noticeable when the dyes were applied to textile fabric by the pigment pad-jig procedure. The dyeings of the new dye were faster to light than those made by the prior art methods.

If, as sometimes happens, the shade of the crude product matches the shade of the standard for the product, no aeration is necessary. In this case the crude material is diluted with water and ground thoroughly, preferably in a high speed paste mill until a smooth, stable suspension is obtained. This suspension is then diluted to the desired consistency with water or made into a powder.

*Example II*

An equivalent amount of 3(4'-hydroxy-phenyl-amino)-ethyl carbazole was used instead of 1.0 part of 3(4'-hydroxy-phenyl-amino)-carbazole and thionated in accordance with the procedure of Example I.

Except for slight differences the products had properties similar to those of the products of Example I, and the same improvements were present.

By similar methods improved products were made from the corresponding methyl carbazole.

The indophenols used as starting materials may be made by condensing nitrosophenol and carbazole or an alkyl carbazole. The indophenols are represented by the formula

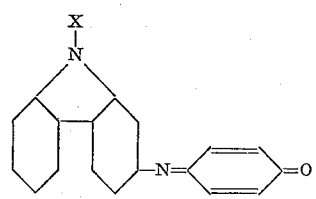

in which X is hydrogen, methyl or ethyl. Either the indophenols or the leuco indophenols from the described indophenols can be used as starting materials to be thionated.

The presence of a higher ratio of water to the mono-methyl-ether of ethylene glycol in the reaction mixture and the use of generally higher sulphur alkali metal polysulphides than those used in prior art processes contribute importantly to the formation of the new products. The greater susceptibility of the new products to controlled oxidation and the accompanying greater light fastness of the dyes are a most surprising consequence. The difference in the constitution of the new products from 3(4'-hydroxy-phenyl-amino)-carbazole as compared to the thionated products produced from this indophenol by prior art processes is indicated by the fact that the new products contain a higher content of sulphur and a lower content of nitrogen than the prior art products and the ratio of sulphur to nitrogen is higher in the new products. A prior art product from 3(4'-hydroxy-phenyl-amino)-carbazole contained 29.24% sulphur and 6.68% nitrogen whereas the product made in accordance with Example I contained 31.7% sulphur and 5.92% nitrogen.

The physical properties of the new thionated products being of a texture which is easily filterable without harmful loss contribute to the economy of the process. The products of the invention when precipitated occur in the thionated form as discrete hard friable pellets or particles of varying size, some of which are often as large as one-eighth of an inch in diameter. The particles filter and wash rapidly without loss. These particles require wet milling to reduce them to a stable suspension but when suspended the shade can be standardized easily without loss of color value in a medium which is basic with an alkali metal hydroxide. The thionated precipitated products of the prior art occur as extremely fine particles which are impalpable to the touch. In the absence of electrolytes they tend to suspend themselves in water spontaneously and for reasons which we are unable to explain they require the use of strong oxidation agents and prolonged grinding for standardization. This is accompanied by loss in color value. The products of the invention are not perceptibly changed by grinding for any practically feasible length of time with sodium perborate, hydrogen peroxide or a mixture of these compounds.

Another difference in the new products as distinguished from those of the prior art is their solubility in hot dilute sodium hydroxide solution. Over 18% of the new crude thionated products are soluble as a general rule in hot dilute sodium hydroxide solution in the absence of oxidizing agents but the solubilty is sometimes as low as 10%. Only about 2% of the prior art products dissolve in a similar solution.

The ratio of water to mono-methyl-ether of ethylene glycol in the thionation medium may be widely varied. About 25% to about 50% water may be present in the mixture of water and mono-methyl-ether of ethylene glycol, but the preferred ratio is about 4 parts water to about 6 parts mono-methyl-ether of ethylene glycol. The approximate boiling points of the thionation media of the invention vary from about 115° C. to about 130° C. and the periods of thionation vary from about 8 to 20 hours.

In the processes of the invention any alkali metal polysulphide can be used, for example sodium or potassium. The polysulphides having generally high sulphur contents are used, namely those having a formula of about $R_2S_7$ to about $R_2S_{8.5}$ in which R represents an alkali metal, but these ratios can be varied. The higher sulphur polysulphides are generally preferred from considerations of speed and completeness of the thionations but where the content of sulphur greatly exceeds that represented by the formula $R_2S_{8.5}$ difficulty is found in disposing of the sulphur after thionation.

The dyes of the invention are used to dye textile fabrics, particularly cotton fabrics from aqueous baths containing small amounts of sodium hydrosulphite or sodium sulphide in shades of blue in varying degrees of redness.

Since from the foregoing description of the invention it will be apparent to those skilled in the art that various other embodiments of the invention may be made without departing from the spirit and scope thereof, it is to be understood that no limitations are intended except those which are specifically recited in the annexed claims or are imposed by the prior art.

We claim:

1. A thionated color obtainable by adding one of the group consisting of 3(4'-hydroxy-phenyl-amino) carbazole and the N-mono-methyl and N-mono-ethyl derivatives thereof to an excess of a solution containing at least sufficient of an alkali metal polysulphide corresponding approximately to the formula $R_2S_7$ to $R_2S_{8.5}$ to thionate said carbazole, mono-methyl-ether of ethylene glycol and water, the mixture of mono-methyl ether of ethylene glycol and water containing about 25% to about 50% water and the remainder mono-methyl-ether of ethylene glycol; refluxing until said carbazole is thionated; adding sodium hydroxide to make the mixture alkaline; and again refluxing until a product is formed which upon removing the solvent by distillation is a granular and friable solid which is readily susceptible to shade variation by aeration when suspended in a dilute water solution of sodium hydroxide.

2. A thionated color obtainable by adding 3(4'-hydroxy-phenyl-amino)-carbazole to an excess of a solution containing at least sufficient of an alkali metal polysulphide corresponding approximately to the formula $R_2S_7$ to $R_2S_{8.5}$ to thionate said carbazole, mono-methyl-ether of ethylene glycol and water, the mixture of mono-methyl ether of ethylene glycol and water containing about 25% to about 50% water and the remainder mono-methyl-ether of ethylene glycol; refluxing until said carbazole is thionated; adding sodium hydroxide to make the mixture alkaline; and again refluxing until a product is formed which upon removing the solvent by distillation is a granular and friable solid which is readily susceptible to shade variation by aeration when suspended in a dilute water solution of sodium hydroxide.

3. A thionated color obtainable by adding one of the group consisting of 3(4'-hydroxy-phenyl-amino)-carbazole and the N-mono-methyl and N-mono-ethyl derivatives thereof to an excess of a solution containing at least sufficient of an alkali metal polysulphide corresponding approximately to the formula $R_2S_7$ to $R_2S_{8.5}$ to thionate said carbazole mono-methyl-ether of ethylene glycol and water, the mixture of mono-methyl ether of ethylene glycol and water containing about 4 parts of water to 6 parts of mono-methyl-ether of ethylene glycol; refluxing until said carbazole is thionated; adding sodium hydroxide to make the mixture alkaline; and again refluxing until a product is formed which upon removing the solvent by distillation is a granular and friable solid which is readily susceptible to shade variation by aeration when suspended in a dilute water solution of sodium hydroxide.

4. A thionated color obtainable by thionating one of a group consisting of 3(4'-hydroxy-phenyl-amino)-carbazole and the N-mono-methyl and N-mono-ethyl derivatives thereof in a reaction medium comprising sodium polysulphide, mono-methyl-ether of ethylene glycol and water, said mixture of mono-methyl-ether of ethylene glycol and water containing about 25% to about 50% water and the remainder mono-methyl-ether of ethylene glycol; refluxing until said carbazole is thionated; adding sodium hydroxide to make the mixture alkaline; and again refluxing until a product is formed which upon removing the solvent by distillation is a granular and friable material which is easily filterable and readily susceptible to shade variation by aeration when suspended in a dilute sodium hydroxide solution.

5. A thionated 3(4'-hydroxy-phenyl-amino)-carbazole which is a blue dye and is composed mainly of granular friable particles that are easily susceptible to reddening by aeration when suspended in water which is made slightly alkaline with sodium hydroxide, at least 10% of said thionated carbazole being soluble in hot dilute sodium hydroxide solution in the absence of oxidizing agents.

6. A process which comprises boiling and refluxing at normal atmospheric pressures one of the group consisting of a 3(4'-hydroxy-phenyl-amino)-carbazole and the oxidized quinoidal derivatives thereof in a reaction medium containing mono-methyl-ether of ethylene glycol, water and at least sufficient of an alkali metal polysulphide to thionate said carbazole, said polysulphide corresponding approximately to the formulae $R_2S_7$ to $R_2S_{8.5}$ in which R is an alkali metal and said mono-methyl-ether of ethylene glycol and water being present in the proportion of about 25% to about 50% water and the remainder mono-methyl-ether of ethylene glycol; said refluxing being carried on until said compounds are thionated; making the medium alkaline; and continuing said boiling with distillation of said glycol until a granular precipitate is formed.

7. A process which comprises boiling and refluxing at normal atmospheric pressures one of the group consisting of a 3(4'-hydroxy-phenyl-amino)-carbazole and the oxidized quinoidal derivatives thereof in a reaction medium containing mono-methyl-ether of ethylene glycol, water and at least sufficient of an alkali metal polysulphide to thionate said carbazole, said polysulphide corresponding approximately to the formulae $R_2S_7$ to $R_2S_{8.5}$ in which R is an alkali metal and said mono-methyl-ether of ethylene glycol and water being present in the proportion of about 25% to about 50% water and the remainder mono-methyl-ether of ethylene glycol, continuing said refluxing until said carbazole is thionated; and removing mono-methyl ether of ethylene glycol by distillation whilst replacing the loss of the distillate with water and maintaining the residual mixture basic with alkali metal hydroxide, until a granular, friable, easily filterable precipitate is formed.

8. A process which comprises heating to boiling at normal atmospheric pressures one of a group consisting of 3(4'-hydroxy-phenyl-amino)-carbazole, 3(4'-hydroxy-phenyl-amino)-methyl carbazole, 3(4'-hydroxy-phenyl-amino) ethyl carbazole and the oxidized quinoidal derivatives thereof in a reaction medium consisting of at least sufficient sodium polysulphide to thionate said carbazole in a mixture of mono-methyl-ether of ethylene glycol and water; refluxing until said carbazole is thionated, said polysulphide corresponding approximately to the formulae $Na_2S_7$ to $Na_2S_{8.5}$ and said mixture of mono-methyl-ether of ethylene glycol and water being in the proportion of about 25% to about 50% water and the remainder mono-methyl-ether of ethylene glycol; adding sufficient sodium hydroxide to combine with free sulphur; and distilling off mono-methyl-ether of ethylene glycol whilst replacing distillate in the residue with water until the thionated product is precipitated as granular friable solids.

9. A process which comprises heating to boiling at normal atmospheric pressures 3(4'-hydroxy-phenyl-amino)-carbazole in a reaction medium consisting of at least sufficient sodium polysulphide to thionate said carbazole and a mixture of mono-methyl-ether of ethylene glycol and water; and refluxing until said carbazole is thionated, said polysulphide corresponding approximately to the formulae $Na_2S_7$ to $Na_2S_{8.5}$ and said mixture being in the proportion of about 4 parts water to about 6 parts mono-methyl-ether of ethylene glycol.

10. The process which comprises heating to boiling at normal atmospheric pressures a mixture of 3.5 parts mono-methyl-ether of ethylene glycol, 1.5 parts water, 1.8 parts sodium hydroxide and 4 parts sulphur, adding 1 part 3(4'-hydroxy-phenyl-amino)-carbazole, refluxing the mixture until said carbazole is thionated, adding sufficient sodium hydroxide to combine with free sulphur, and distilling off mono-methyl-ester of ethylene glycol whilst replacing distillate in the residue with water until the thionated product is precipitated as granular friable solids.

NEWELL M. BIGELOW.
JOHN ELTON COLE.